United States Patent
Kimmitt et al.

(10) Patent No.: US 10,873,407 B2
(45) Date of Patent: Dec. 22, 2020

(54) TRANSMITTER TUNING USING RECEIVER GRADIENT

(71) Applicant: Marvell Asia Pte, Ltd., Singapore (SG)

(72) Inventors: Myles Kimmitt, Marlborough, MA (US); Scott D. McIlhenny, Marlborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/191,838

(22) Filed: Nov. 15, 2018

(65) Prior Publication Data
US 2020/0162175 A1  May 21, 2020

(51) Int. Cl.
| | | |
|---|---|---|
| H04B 17/336 | (2015.01) | |
| H04B 7/06 | (2006.01) | |
| H04B 17/382 | (2015.01) | |

(52) U.S. Cl.
CPC ......... H04B 17/336 (2015.01); H04B 7/0684 (2013.01); H04B 17/382 (2015.01)

(58) Field of Classification Search
CPC ...... H04B 17/336; H04B 17/14; H04B 17/13; H04B 17/318
See application file for complete search history.

(56) References Cited

U.S. PATENT DOCUMENTS

| | | | | |
|---|---|---|---|---|
| 6,907,064 B1* | 6/2005 | Tokunaga | .......... | H03H 21/0012 375/229 |
| 2010/0329325 A1* | 12/2010 | Mobin | .............. | H04L 25/03057 375/232 |
| 2011/0268169 A1* | 11/2011 | Mitsugi | ............... | H04L 25/0212 375/226 |
| 2014/0098844 A1* | 4/2014 | Mobin | ..................... | H04B 1/40 375/219 |
| 2015/0110165 A1 | 4/2015 | Ramadoss et al. | | |
| 2017/0279488 A1* | 9/2017 | Wang | ....................... | H04B 3/10 |

* cited by examiner

*Primary Examiner* — Wen W Huang
(74) *Attorney, Agent, or Firm* — Hamilton, Brook, Smith & Reynolds, P.C.

(57) ABSTRACT

A controller operates to adjust a transmitter to optimize transmission of a communications signal. The controller measures properties of a signal received from a transmitter, and generates a figure of merit (FOM) for the signal. The FOM is compared against a record of previous FOMs and corresponding previous transmitter tap values, the transmitter tap value indicating settings of a transmitter equalizer of the transmitter during transmission of the signal. A differential between the FOM and a plurality of the previous FOMs is determined, and, in response to the differential being positive, a subsequent tap value is selected from a subset of potential tap values. The subsequent tap value is sent to the transmitter for adjustment of the transmitter equalizer.

21 Claims, 19 Drawing Sheets

TRANSMITTER TUNING USING RECEIVER GRADIENT

BACKGROUND

Driven by the fast advancement of applications in several fields of technology, such as cloud computing, autonomous vehicle, and virtual reality, the demand for increasing data throughput is greater than ever before. A typical hardware platform often employs multi-Gbps serial data links, such as PCI express, Ethernet, and serial ATA (SATA). The challenge for transferring data at such high speed with low-FOM hardware, such as an FR4 Printed Circuit Board (PCB), is that a transmission channel through which the data is transferred, can cause severe inter-symbol interference (ISI) as a result of being high-loss, non-linear, and/or reflective. ISI degrades the data received by a receiver, where the degradation can include reduced eye height and eye width of the received data signal. Such degradation can increase at higher speeds of data transfer, leading to errors in the sampling of the data signal.

SUMMARY

Example embodiments include a circuit configured to adjust a transmitter to optimize transmission of a communications signal. The circuit may include a receiver, a monitor, a controller, and an interface. The receiver may be configured to receive a signal from a transmitter. The monitor may be configured to measure properties of the signal and generate a figure of merit (FOM) for the signal, the FOM indicating a measure of signal-to-noise. The controller may be configured to compare the FOM against a record of previous FOMs and corresponding previous transmitter tap values, the transmitter tap value indicating settings of a transmitter equalizer of the transmitter during transmission of the signal. The controller may further determine a differential between the FOM and a plurality of the previous FOMs. In response to the differential being positive, the controller may select a subsequent tap value from a subset of potential tap values. The interface may be configured to send the subsequent tap value to the transmitter for adjustment of the transmitter equalizer.

The controller may be further configured to generate the record based on previous adjustment and measurement of the signal. The subset of potential tap values may each provide a transmit signal amplitude that is substantially the same across the potential tap values. The subset of potential tap values may exclude tap values associated with a signal amplitude that is substantially lower or higher than a signal amplitude associated with the tap value. The controller may be further configured to calculate an average FOM from the plurality of previous FOMs, the differential being relative to the average FOM.

The controller may be further configured to determine whether the tap value is a final tap value. The controller may determine the final tap value in response to the differential being below the threshold. The controller may determine the final tap value in response to detecting that the FOM and a plurality of the previous FOMs are within a threshold range. The controller may determine the final tap value based on a match between the tap value and the previous tap values, the match indicating a repetition among tap values. The controller may determine the final tap value in response to a timer surpassing a threshold value. The controller determines the final tap value in response to detecting the FOM being above a signal quality threshold.

The controller may be further configured to detect an adverse move based on the FOM indicating a decrease in signal-to-noise relative to the previous FOMs. The controller may be further configured to select the subsequent tap value to reverse the decrease in signal-to-noise. The controller may be further configured to adjust the receiver equalizer tap coefficients, linear equalizer response, and voltage gain based on the FOM indicating an increase or decrease in signal-to-noise relative to the previous FOMs.

Further embodiments may include a method of tuning a transmitter. A signal may be from a transmitter, and the properties of the signal may be measured to generate a figure of merit (FOM) for the signal, the FOM indicating a measure of signal-to-noise. The FOM may be compared against a record of previous FOMs and corresponding previous transmitter tap values, the transmitter tap value indicating settings of a transmitter equalizer of the transmitter during transmission of the signal. A differential between the FOM and a plurality of the previous FOMs may be determined. In response to the differential being positive, a subsequent tap value from a subset of potential tap values may be selected, and the subsequent tap value may be sent to the transmitter for adjustment of the transmitter equalizer.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Example embodiments provide for tuning the remote transmitter filter taps in a high speed digital data transmission system. A recovered receiver eye can be utilized to measure a FOM, which can be used to tune the remote transmitter equalizer to optimize the receiver eye opening. A gradient steepest ascent algorithm is used by the tuning control loop to control the FIR/FFE filter tap tuning. The transmitter filter tuning convergence can be determined using several methods, including: 1) flattening of the FOM using the measured difference between successive measurements (e.g. delta filtered FOM), 2) sensing a repeating pattern in the transmitter tap dithering, and 3) convergence by exceeding a programmable FOM threshold, or 4) exceeding a maximum number of tap dither iterations. Such methods also improve the equalizer training convergence time by employing a "FOM cache" to improve the averaging of the current tap dither using historical data of similar tap dither information. Simulations of actual backplane Ethernet channels also show that training/tuning convergence is also improved from a repeatability perspective using the FOM cache historical averaging and repeating pattern matching algorithm. A solution that consistently tunes the remote transmitter to the same tap values is important to ensure confidence in the convergence stability of the tuning mechanism which can be susceptible to noise in the data transmission system.

The IEEE 802.3 Clause 72 (10GBASE-KR) industry standard specification specifies the communication protocol used between Ethernet link partners to perform the remote transmitter tuning. However, this specification does not indicate how to determine when the tuning is complete or how to optimize the tuning. Example embodiments provide a mechanism and process to guide the remote transmitter tuning in order to optimize the local receiver eye opening, thereby maximizing the receiver signal to noise ratio. Embodiments also provide a criteria (i.e., a FOM) to the signal when the tuning is complete and provide a figure of merit to determine how well the link is tuned. It can actively measure the tuning progress and provide signaling to terminate the tuning process when the tuning can no longer be improved any further or reaches predetermined tuning criteria. The tuning mechanism also provides mechanisms to speed up the tuning convergence, and provides superior tuning repeatability, arriving at the same or similar tuning coefficients each time the link is re-tuned.

Figure 1:
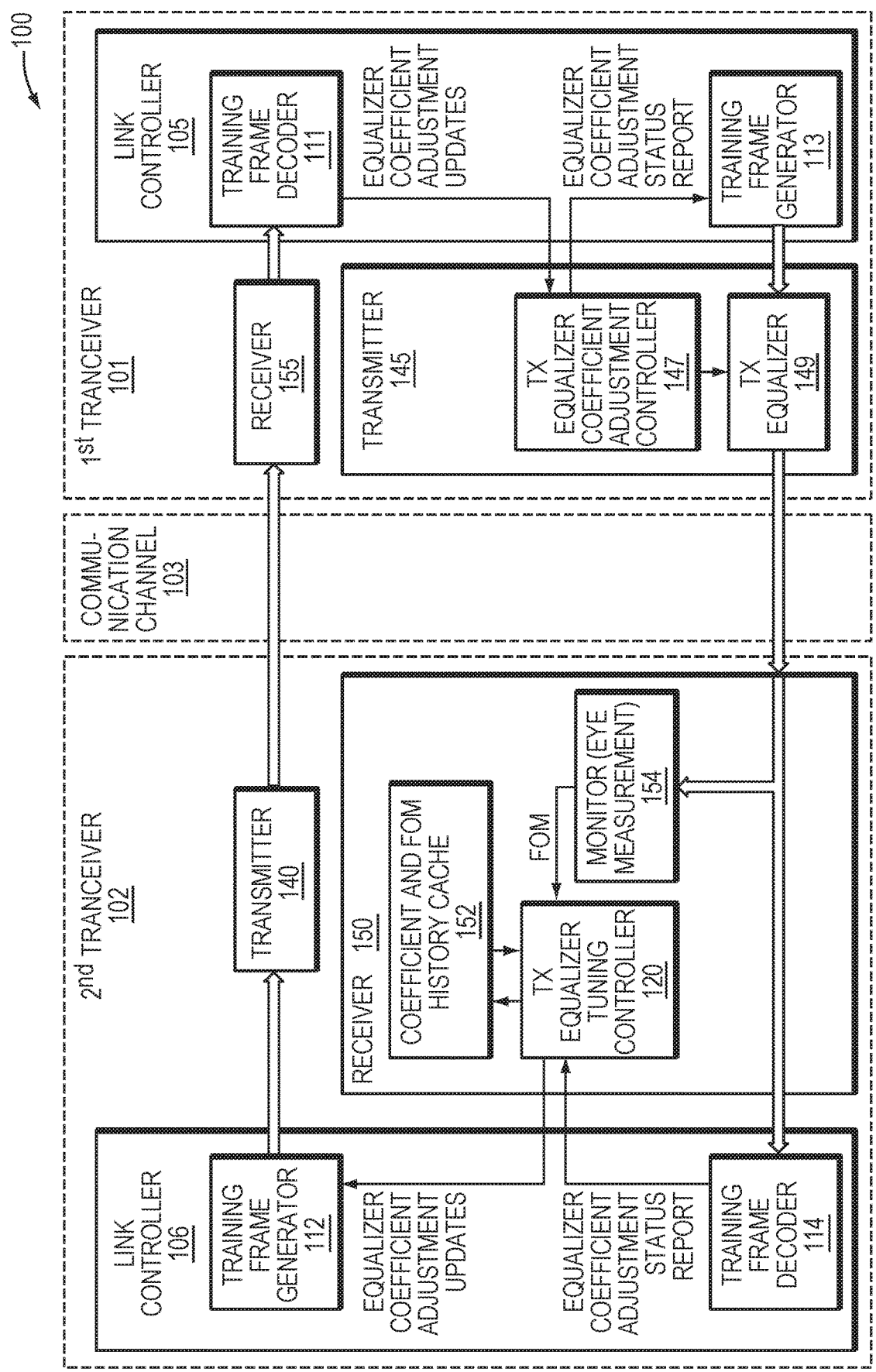
FIG. 1 is a block diagram of a pair of transceivers in which an example embodiment is implemented.

FIG. 1 is a block diagram of a communications system 100 including a pair of transceivers 101, 102 in which an example embodiment is implemented. The transceivers 101, 102 communicate via a communications channel 103 (e.g., a backplane or cable media). Each of the transceivers 101, 102 includes a respective transmitter 140, 145, receiver 150, 155, and link controller 105, 106. The transmitters 140, 145 each transmit communications to the receiver 150, 155 of the other transceiver via the communications channel 103. The link controllers 105, 106 operate with the receivers and transmitters to establish a link across the communication channel 103 and, in particular, facilitate training at each end of the link.

Communications across the channel 103 are susceptible to signal distortion or noise that can adversely affect receipt of the transmitted data. To minimize such noise and optimize the signal from the transmitter 145 to the receiver 150, the transmitter 145 may employ a transmit equalizer 149. The transmit equalizer 149 can provide for variable filtering of the transmitted signal, and can potentially introduce pre-distortion that is effective in negating some or all of the distortion occurring during transmission across the channel 103, thereby improving the signal-to-noise ratio (also referred to as the figure of merit (FOM)) of the signal when received at the receiver 150.

To optimize the received signal, the transmit equalizer 149 can be tuned appropriately. Previous approaches to equalizer tuning involve a process of selecting an initial predistortion setting, and gradually changing the setting in response to feedback regarding the noise detected at the receiver. However, such a process can be time-consuming, and can result in a sub-optimal tuning due to an inability to correctly identify an optimal tuning setting within an allocated time period.

Example embodiments provide for fast and optimal tuning of a transmit equalizer to enable clear signal transmission across a communication channel. With reference to the example of FIG. 1, the transmitter 145 may transmit a training signal to the receiver 150. The transmitter 145 may have applied a predistortion to the training signal via the transmit equalizer 149. Transmitter tap values may indicate settings of a transmitter equalizer 149 during transmission of the signal, and the tap values may be conveyed in a training frame portion of the training signal. The link controller 105 may include a training frame generator 113 to generate the training frame for inclusion in the training signal.

At the receiver 150, a monitor 154 may receive the training signal and measure properties of a training pattern portion of the training signal. In particular, the monitor 154 may measure the eye of the training pattern and generate a FOM for the signal, the FOM indicating a measure of signal-to-noise. A training frame decoder 114, at the link controller 106, may also receive the training signal, and may decode the training frame to determine an equalizer coefficient adjustment status report. This report can indicate the present transmitter tap value of the transmit equalizer 149, and can forward this value to a controller 120. The controller 120 may compare the FOM against a record of previous FOMs and corresponding previous transmitter tap values, which can be stored at the cache 152. The controller 120 may further determine a differential between the FOM and a plurality of the previous FOMs. Based on this differential (e.g. the differential being positive or above a threshold value), the controller 120 may select a subsequent tap value from a subset of potential tap values. The controller 120 may then send the subsequent tap value (equalizer coefficient adjustment updates) along a path to the transmitter 145 for adjustment of the transmitter equalizer 149. Specifically, the controller 120 may forward the update to a training frame generator 112, which encodes this update to a training frame that the transmitter 140 sends to the receiver 155. A training frame decoder 111 at the link controller 105 then decodes the training frame to derive the updates, forwarding the updates to an equalizer controller 147. The equalizer controller 147 adjusts the transmit equalizer 149 accordingly, such that subsequent signals are transmitted with predistortion as a function of the subsequent tap value.

The controller 120 may be further configured to generate the record of previous FOMs and corresponding previous transmitter tap values based on previous adjustment and measurement of the signal, and store the record to the cache 152. The subset of potential tap values may each provide a transmit signal amplitude that is substantially the same across the potential tap values, and may exclude tap values associated with a signal amplitude that is substantially lower or higher than a signal amplitude associated with the tap value. The controller 120 may be further configured to calculate an average FOM from the plurality of previous FOMs, where the differential is relative to the average FOM.

The controller 120 may be further configured to determine whether the tap value is a final tap value and conclude the training process, and it may determine the final tap value in one or more different ways. For example, the controller 120 may determine the final tap value 1) in response to the differential being below the threshold; 2) in response to detecting that the FOM and a plurality of the previous FOMs are within a threshold range; 3) based on a match between the tap value and the previous tap values, the match indicating a repetition among tap values; 4) in response to a timer surpassing a threshold value; and/or 5) in response to detecting the FOM being above a signal quality threshold.

The controller 120 may also be configured to detect an adverse move based on the FOM indicating a decrease in signal-to-noise relative to the previous FOMs. The controller 120 may then select the subsequent tap value to reverse the decrease in signal-to-noise. The controller may also adjust the receiver equalizer tap coefficients, linear equalizer response, and voltage gain based on the FOM indicating an increase or decrease in signal-to-noise relative to the previous FOMs.

Figure 2A:
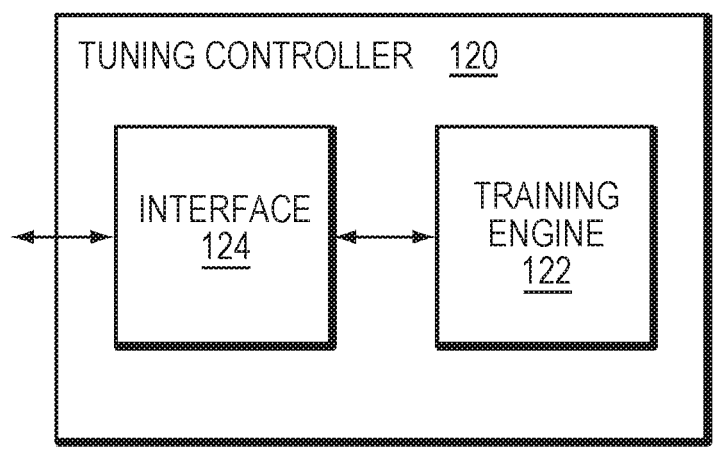
FIGS. 2A-B are block diagrams illustrating a tuning controller in one embodiment.
Figure 2B:
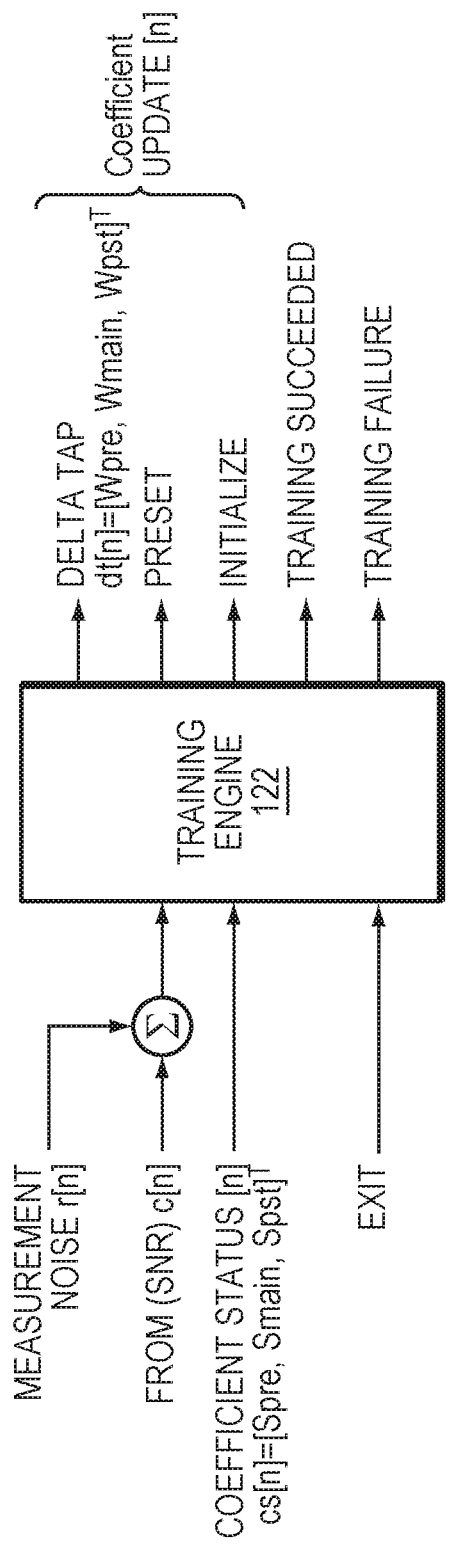

FIGS. 2A-B are block diagrams illustrating a tuning controller in one embodiment. As shown in FIG. 2A, the controller 120 may include a training engine 122 and a controller interface 124. With reference to FIG. 1, the training engine 122 may communicate with the monitor 154, cache 152, training frame decoder 114, and training frame generator 112 via the controller interface 124.

FIG. 2B illustrates the training engine 122 (also referred to as a link training state machine (LTSM)) in further detail. The training engine 122 may receive a measurement noise value r[n] and FOM value (signal-to-noise ratio) c[n] (indicating the FOM) from the monitor 154, and receive the equalizer coefficient adjustment status value cs[n] from the training frame decoder 114. The engine 122 may also output a coefficient update (indicating the subsequent tap value), which can comprise a delta tap value dt[n], a preset value and an initialize command. The training engine 122 can also output a signal indicating whether the training is successful (i.e., the tap value is a final tap value), or is a failure, indicating the need for further training or a diagnostic process.

The training engine 122 may optimize the settings of the transmit equalizer 149 using a gradient steepest ascent method based on the FOM at the receiver 150 versus transmit tap setting. The training engine 122 may communicates with the transmitter 145 using a backchannel with the coefficient update and coefficient status messages in accordance with Ethernet and PCIe standards. The training engine 122 can measure the FOM iteratively using a series of predefined tap dithers, and can move towards the optimal tap settings along the ascending FOM gradient. The coefficient updates can be determined based on the FOM measurements (e.g., SNR voltage ratio) and the coefficient status (e.g., whether the tap is presently at a maximum or minimum setting), without the need for additional information, such as the direction of the tuning. A series of tests can be used to determine if the process is close to the maximum FOM, and then convergence can be determined and a "training succeeded" flag can be set. Alternatively, training failure can occur if convergence is not achieved within a predefined number of iterations. The FOM measurements may exhibit noise, and the training engine 122 can mitigate the effect of this noise on the tap setting accuracy. The filtered FOM and cumulative moving average FOM may be used to mitigate the effects of the FOM measurement noise.

Figure 3:
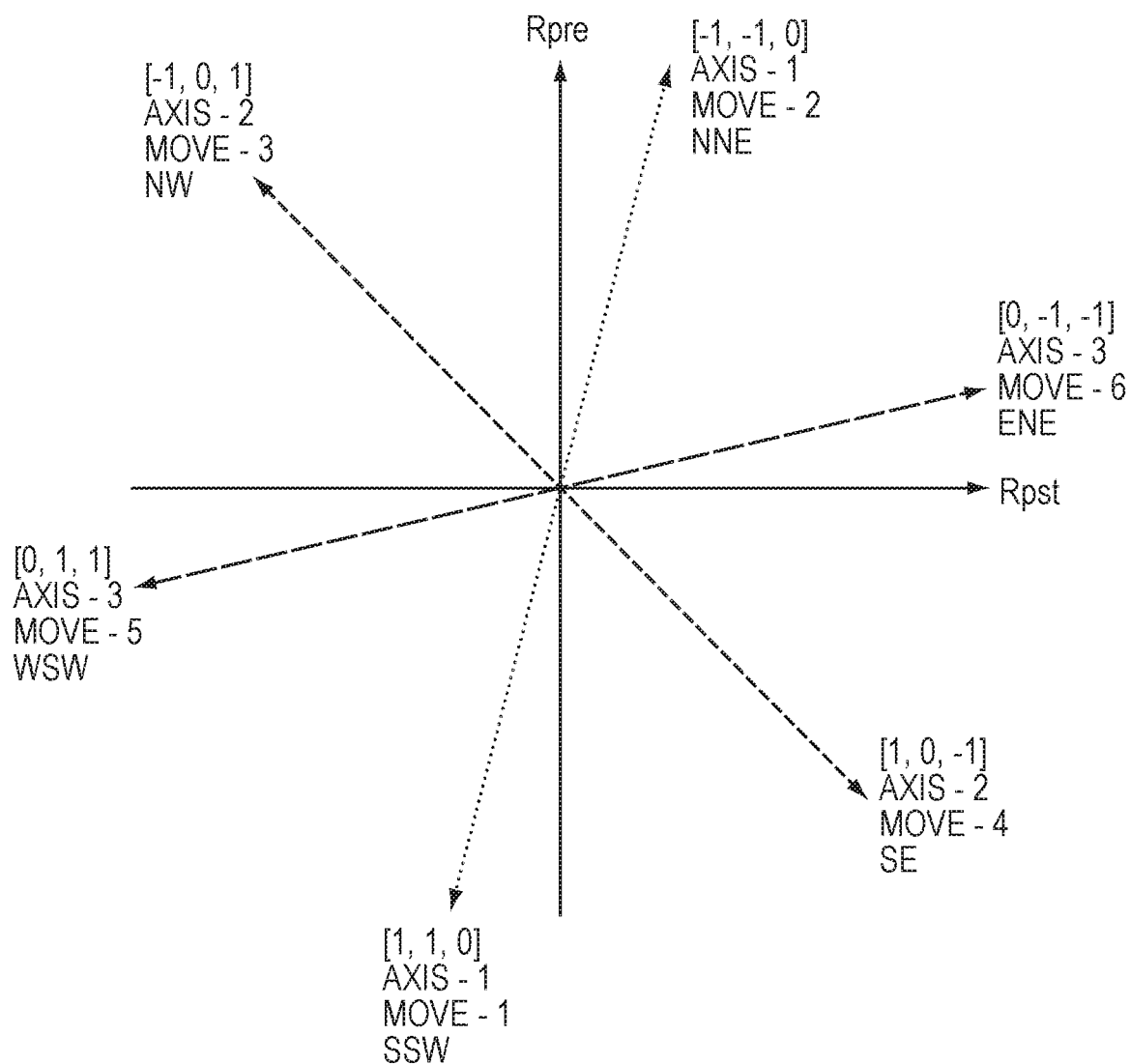
FIG. 3 is a plot illustrating a set of tap moves that may be implemented in one embodiment.

FIG. 3 is a plot illustrating a set of tap moves that may be implemented in one embodiment. The Ethernet standard, for example, limits tap moves to incremental+1/0/−1 steps, with normalized step amplitude specified between 0.0083 and 0.050. This limitation results in a non-linear control system with 16 dB loop gain variation. Referring again to FIG. 1, the transmit equalizer 149 may have three taps, meaning that each adjustment of the taps may have 27 total degrees of freedom. In example embodiments, the controller 120 may limit the number of possible tap moves with the goal of maintaining a peak transmit amplitude constant. Such a limitation may be beneficial for a number of reasons. In particular, optimal system performance may be found along an arc exhibited under this subset of tap moves. By limiting the number of possible tap setting, and avoiding unnecessary trial and error with other tap setting, the system may locate an optimal tap setting more quickly. The limited tap moves may also match the capability of most transmitters.

In the example shown in FIG. 3, the number of tap moves is limited to six degrees of freedom. In particular, the six constant amplitude tap moves [dWpre, dWmain, dWpst] may be defined as the following codes: [1, 1, 0], [−1, −1, 0], [−1, 0, 1], [1, 0, −1], [0, 1, 1], [0, −1, −1], where the moves adhere to the Ethernet increment/hold/decrement (1/0/−1) definition. The codes represent three movement axes on the transmit FFE emphasis control plane:

a) Rpre=(Wmain+Wpst−Wpre)/(Wpre+Wmain+Wpst)

b) Rpst=(Wmain+Wpre−Wpst)/(Wpre+Wmain+Wpst)

The axes may precess and bend with location on the control plan:

a) Axis-1 aligns to Rpre and is straight when Rpst=1 (Wpre=0)

b) Axis-3 aligns to Rpst and is straight when Rpre=1 (Wpst=0)

c) Axis don't shift much locally and remain with their quadrant d) Axis errors compensated by feedback inherent in the control During a tuning process, the controller 120 may either reverse direction from last move if FOM gets worse, or may let the last move stand and allow subsequent moves to correct for the wrong move. It may be beneficial to start the adaption around taps equal to [−0.1,0.9,0] to avoid trapping on the Wpst=0 axis. For example, a present of [0,1,0] may serve well as an initial setting for most cases. Conversely, an initial setting near [−0.050,0.675,−0.275] may cause adverse effects such as entering low gradient regions and poor convergence.

Thus, the controller 120 may use a series of constant amplitude tap moves to locate the optimal tap settings (e.g., the setting with the highest receiver FOM). The controller 120 may use a gradient ascent method to determine the move direction from local gradients. The FOM (e.g., sampling SNR) may appear to be a convex function, meaning there would be only a single (i.e., global) maximum FOM. The process carried out by the controller 120 may depart from traditional gradient ascent in that the incremental step gain (g) may be fixed by the transmit tap step and cannot be adjusted. The controller 120 may proceed iteratively from current tap location, $x_n$ (Rpre,Rpst), to a next tap location, $x_{n+1}$ (Rpre,Rpst), based on gradients at the current point along the three movement axes. The axes may not need to be orthogonal, but preferentially should cover all quadrants for correct 2-D movement of Rpre & Rpst:

$$x_{n+1} = x_n + g \cdot \nabla F(x_n) \quad (1)$$

where the gradient may be expressed as:

$$\nabla F(x_n) = \left[\text{sign}\left(\frac{\partial f(x_n)}{\partial A1}\right) \; \text{sign}\left(\frac{\partial f(x_n)}{\partial A2}\right) \; \text{sign}\left(\frac{\partial f(x_n)}{\partial A3}\right)\right] \quad (2)$$

An estimate of the gradient may be derived from the FOM by dithers (moves) along each axis. However, for speed and efficiency, as well as to meet operational standards such as those of PCIe, the number of FOM evaluation may be minimized. Accordingly, the controller 120 may combine tap moves for gradient evaluation with tap moves towards optimal location to save FOM evaluations. The controller may use the previous move direction as the current move direction, where the gradient is updated after each move, and an overshoot is correct in subsequent moves. A feedback loop may be used to correct errors in the gradient estimates. If the gradient estimate is incorrect, subsequent moves can correct for the error. The controller 120 may progress through tap moves by moving along each axis in a round-robin order, under a presumption that previous gradients will still be roughly valid, even though the tap has incrementally moved along other axes since previous evaluation. The gradients may be evaluated by subtracting the previous FOM value from the current FOM value.

Figure 4A:
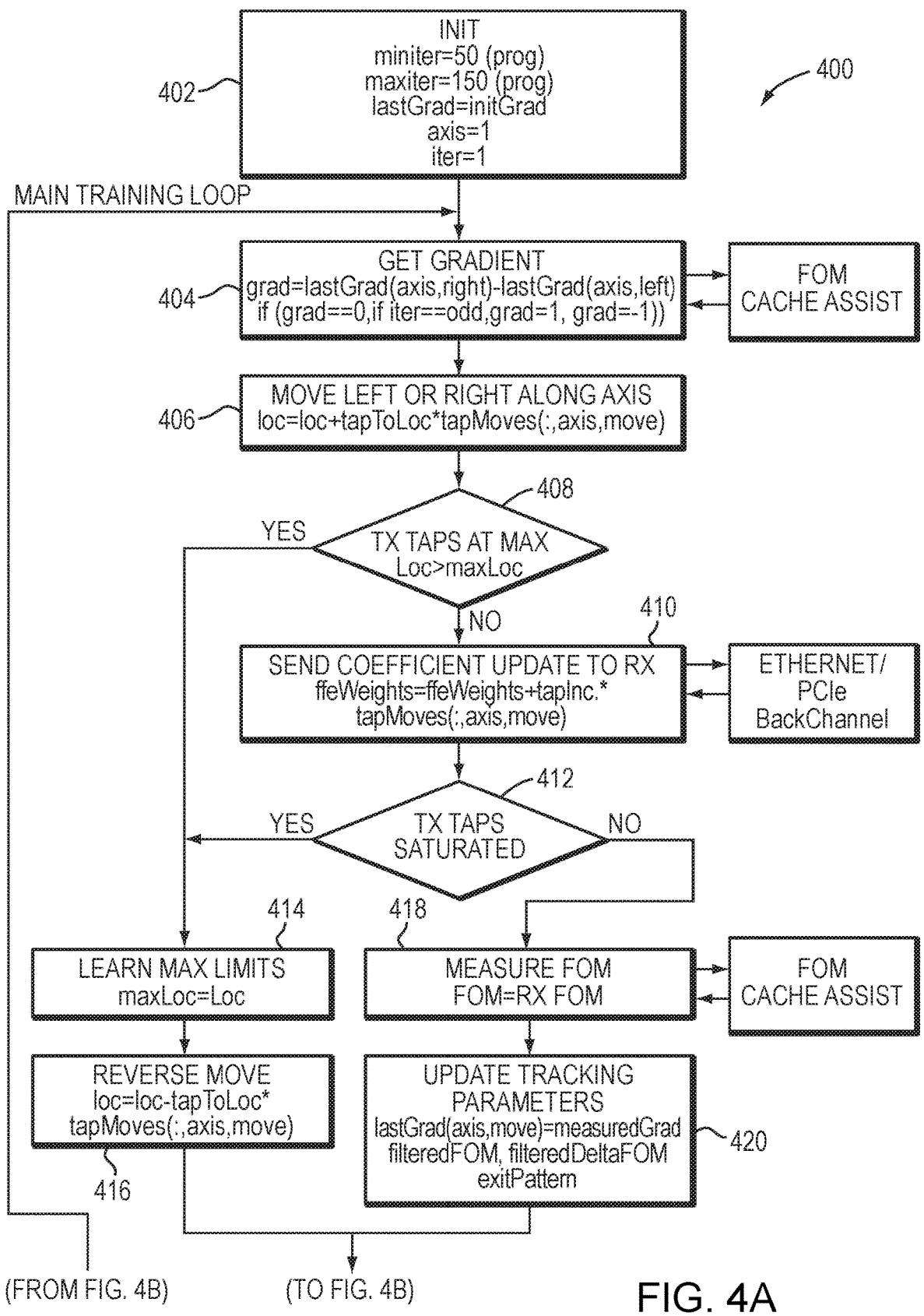
FIGS. 4A-B are a flow diagram of a process of training a link carried out by a tuning controller in one embodiment.
Figure 4B:
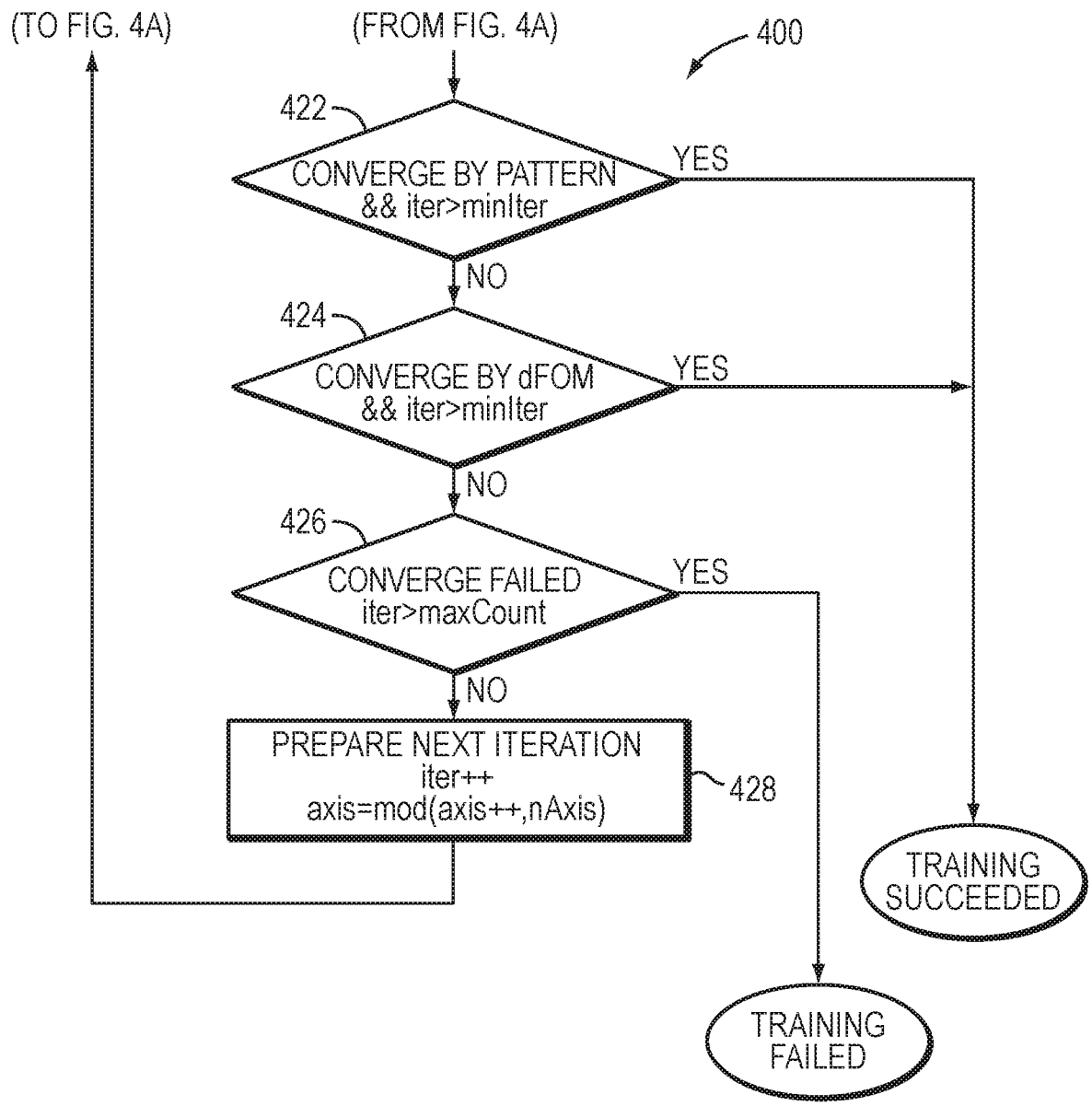

FIGS. 4A-B are a flow diagram of a process 400 of tuning a transmitter equalizer in one embodiment. The process 400 (also referred to as the "main loop") may be carried out, for example, by the tuning controller 120 to configure the transmit equalizer 149 during a link training process when establishing a link between the first and second transceivers 101, 102 across the communications channel 103. With reference to FIGS. 1-3, upon initialization (402) the controller 120 may determine a gradient (404), and, based on the gradient, determine a next tuning setting as a move along an axis, as described above with reference to FIG. 3 (406). If the present setting is already at a maximum (408), then this maximum may be identified and noted (414), and the move is reversed (416). Otherwise, the controller 120 may send the next tuning setting (a coefficient update) to the transmit equalizer 149 along the path described above (410). Provided that the equalizer taps are not saturated (412), the controller 120 may then measure the FOM resulting from the new equalizer settings based on a FOM of a subsequent signal measured by the monitor 154 (418), and then update the tracking parameters (e.g., gradient) accordingly (420).

The controller 120 may then perform one or more evaluations to determine whether the training has succeeded or failed, or whether to enter a further iteration of adjustment. For example, the controller 120 may determine whether the process has succeeded by attained a convergence by pattern (422) or a convergence by exceeding a delta FOM threshold (424), both of which are described in further detail below. Alternatively, if the controller 120 has reached a maximum number of adjustment iterations (426), it may determine that the training has failed, necessitating a repeat of the process or further diagnostic or remedial action. Otherwise, the controller 120 may prepare a next iteration of the equalizer adjustment (428), and repeat the process 400.

Figure 5:
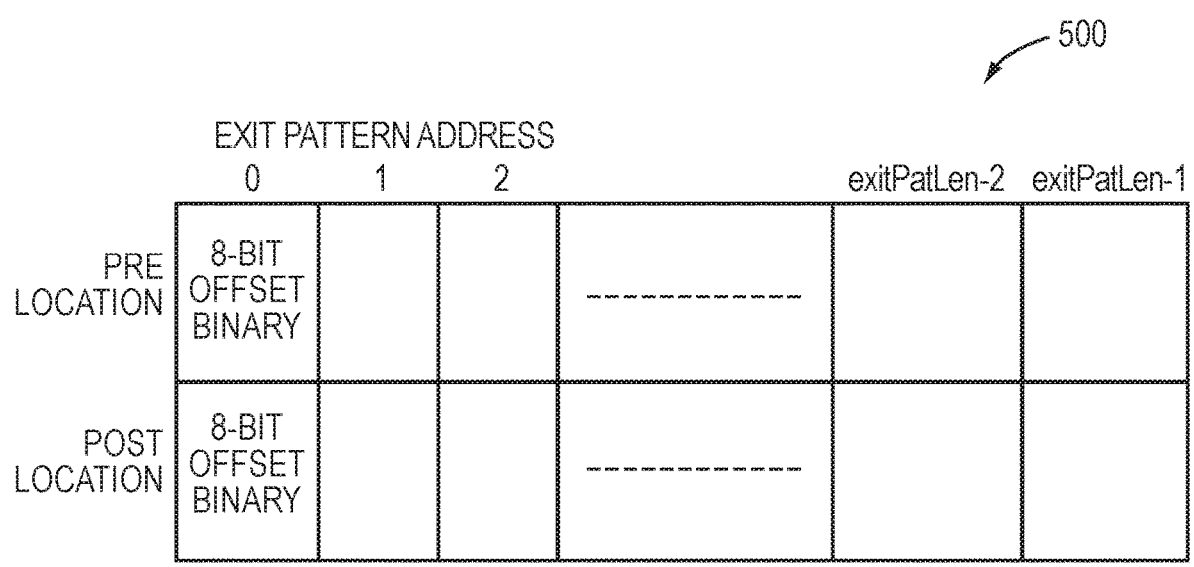
FIG. 5 is a table illustrating an example data structure of an exit pattern.

FIGS. 5 and 6 illustrate an example implementation for determining a convergence by pattern, such as the determination 422 of FIG. 4B. A repeating pattern of tap moves occur when the controller 120 is in the region of the optimal FOM value. This pattern can be detected, and training convergence declared at the best FOM value within this pattern. Gradient averaging increases FOM estimation and tap movement accuracy over time around the final value when it is used making pattern convergence more likely over time. The pattern convergence method works for all tap movement modes (e.g., pre+post, pre-only, reverse & no reverse) without adjustment.

Pattern convergence can be difficult if the FOM samples are noisy or the tap steps are small. As such, it can be used in parallel with other convergence criteria such as delta FOM and a max iteration timer. Allowing gradient averaging and pattern recognition time to work improves overall convergence accuracy and repeatability of link training so the other methods are set to occur later in time if pattern recognition is having difficulty.

FIG. 5 is a table illustrating an example exit pattern data structure 500, which may be stored to the cache 152 of FIG. 1. In an example embodiment, the lowest common multiple (LCM) of all possible tap patterns that might occur around the optimal FOM value in the different modes of operation may be twelve. Thus, a memory structure to capture tap movement with a history of twelve may be defined, and may have 2×8×12=192 bit locations. Any repeating tap movement pattern around the optimal FOM value may be repetitive in this structure. Pre- and post-tap location history can be stored as two 8-bit offset binary fields (covering −128 to +127 delta tap moves for each from the starting point), and the tap location fields are accessed sequentially from main loop iteration count modulo 12. The main tap value can be algorithmically tied to the pre- and post-values and so is redundant in establishing a movement pattern, and need not be tracked.

Pattern recognition may be enabled partway through the link training process to prevent a false exit in poor gradient regions. This condition may be set for all exit checks and can be set by a "minimum iteration counter."

Figure 6A:
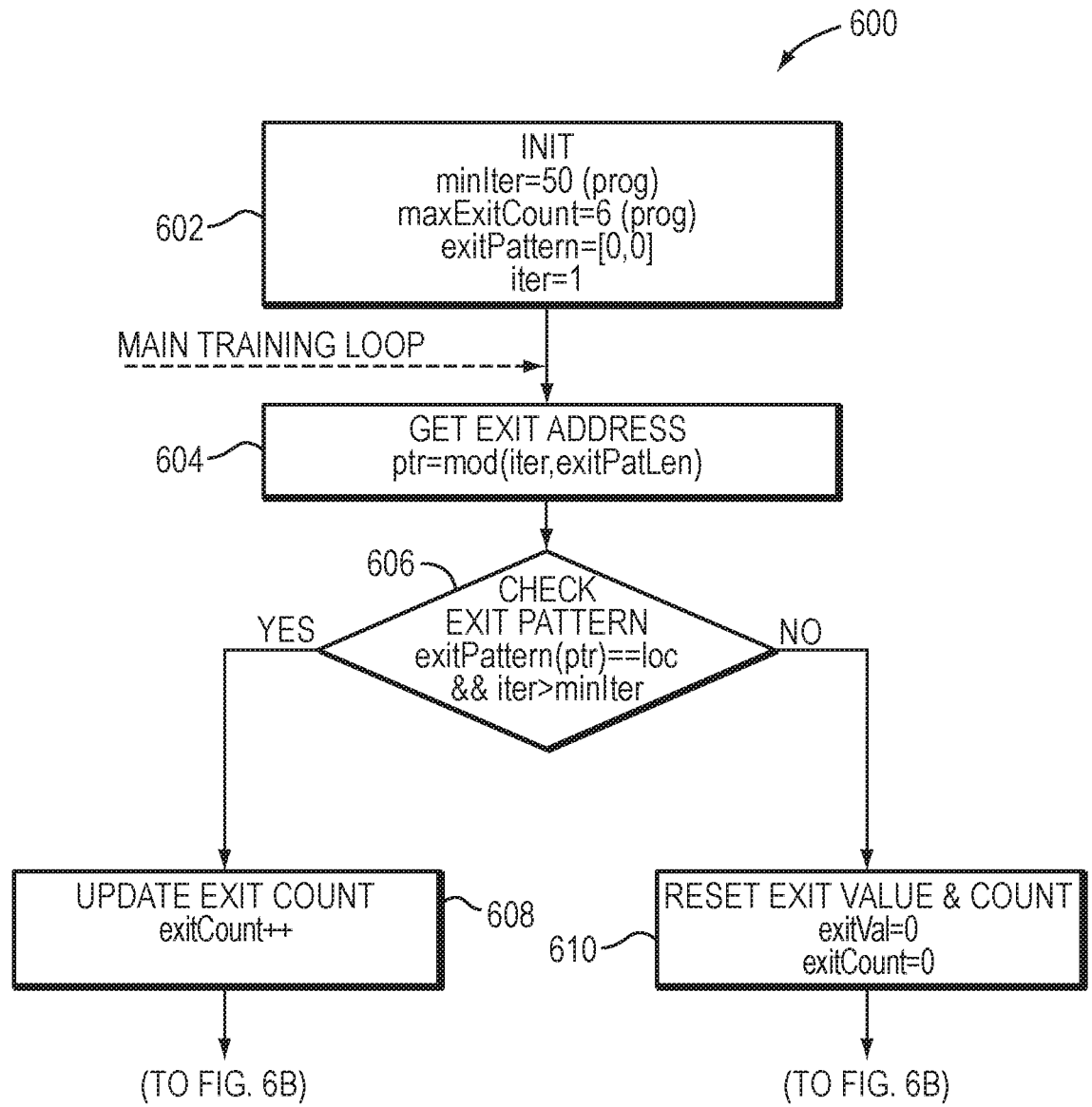
FIGS. 6A-B are a flow diagram illustrating a process of verifying an exit pattern.
Figure 6B:
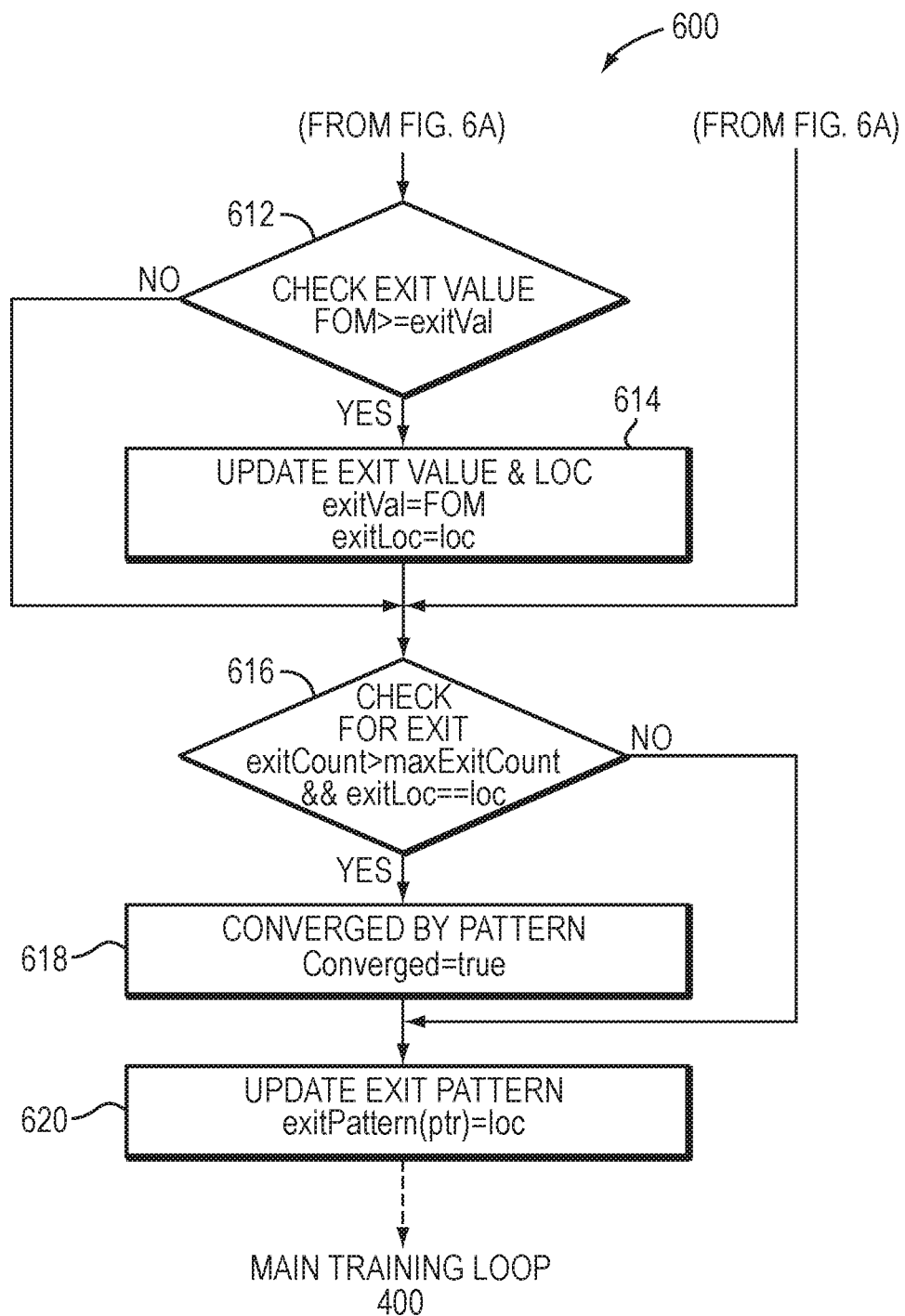

FIGS. 6A-B are a flow diagram illustrating a process 600 of evaluating an exit pattern. The exit pattern check can be executed once every main loop 400 iteration, where the exit pattern check can be conducted at operation 422. With reference to FIGS. 1-5, upon initialization (602), the controller 120 may obtain an exit address from the current iteration (604), and compare it against the exit pattern (606). If a match is determined, the controller 120 may then iterate an exit count (608), and then check the exit value by comparing the present FOM against the highest recorded FOM within the exit pattern (612). If the present FOM is higher, the highest recorded FOM is updated accordingly (614).

The controller 120 may then check for whether exit criteria are met, determining whether the exit count has exceeded a maximum count and the present equalizer settings are aligned with the maximum recorded FOM (616). If so, the controller 120 can confirm a pattern convergence (618) and proceed with the present equalizer settings (620). Otherwise, the process 600 may return to the main loop 400.

FIGS. 7-11 illustrate an example implementation for determining a convergence by FOM, such as the determination 424 of FIG. 4B. The FOM gradient versus iteration may settle close to zero as the controller 120 approaches and wanders around the optimal FOM value after an initial step transient. FOM gradient may be more predictable than tap gradient, which can wander in flat FOM regions near the optimal. Link training convergence can be declared when the FOM gradient falls within a range close to zero.

Filtering the FOM values may be beneficial to reduce noise from the delta FOM measurement. Tap moves produce natural variations in FOM even in the steady state due to bang-bang control and control quantization. Delta FOM (or slope) measurement, being a derivative, may be naturally sensitive to noise. Single pole infinite impulse response (IIR) low pass filters are effective in smoothing the FOM and delta FOMs. The method described herein may be effective for all tap movement modes (pre+post, pre-only, reverse & no reverse) without adjustment. A minimum iteration count can be used to prevent early exit if link training starts in a low gradient area.

Figure 7:
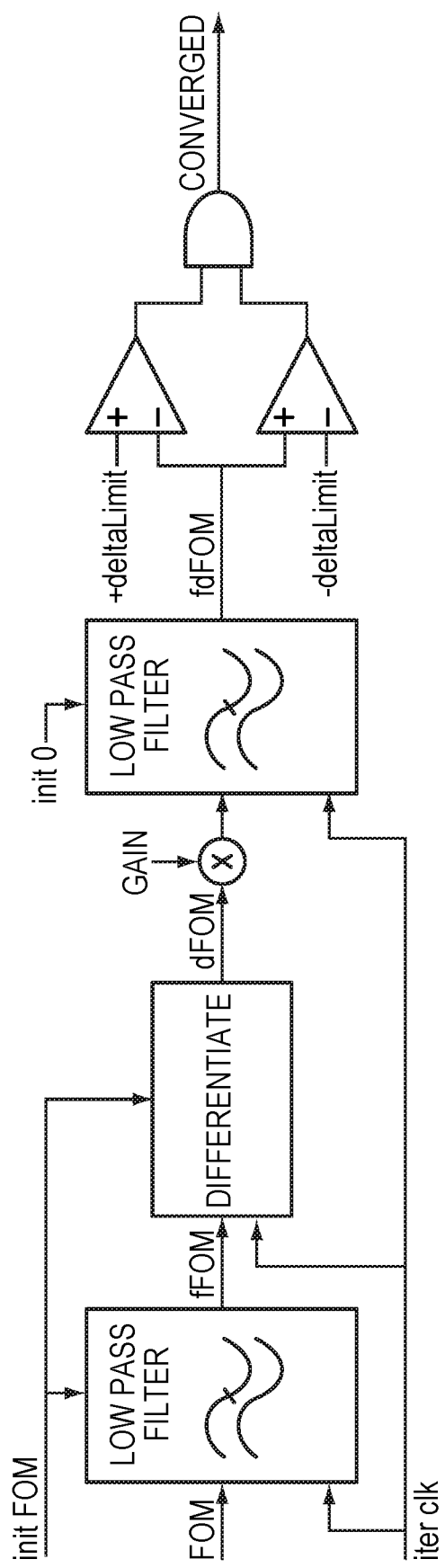
FIG. 7 is a block diagram of logic that may be implemented to determine delta FOM convergence in one embodiment

FIG. 7 is a block diagram of logic 700 that may be implemented by the controller 120 to determine delta FOM convergence. As shown, the logic may be implemented as a chain of two low pass filters, a differentiator and two threshold detectors. The filtered FOM (fFOM) is derived from the FOM value using a low pass filter which implements the recursive equation:

$$fFOM_{n+1} = fFOM_n + \text{round}\left(\frac{FOM_{n+1} - fFOM_n}{FOM_{TC}}\right) \quad (3)$$

The value $FOM_{TC}$ is the filter time constant, and is constrained to the form $2^m$, where m is an integer to make the division a shift. Truncation of the division term can be problematic, as the recursive design will produce a systematic output offset due to continuous underestimation at each iteration. Rounding is accomplished by adding one to the division result if the bit immediately below the LSB after shifting is set. This bit represents a remainder >0.5 if it is set.

Figure 8:
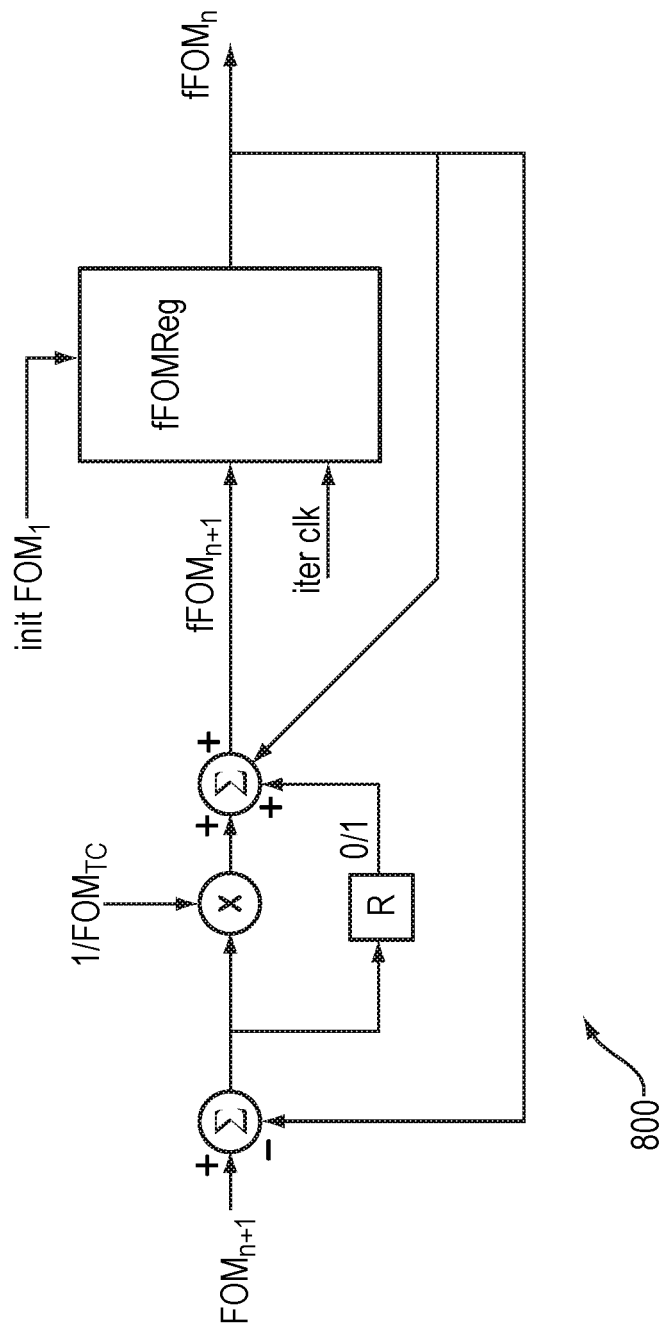
FIG. 8 is a block diagram of an example filter in one embodiment.

FIG. 8 is a block diagram of an example low pass IIR filter 800 that may be implemented in the logic 700 of FIG. 7. The filter structure can be implemented as a series of combinatorial logic around the output register. The filter output may have the same range as the filter input although some terms in the combinatorial logic are signed.

Figure 9:
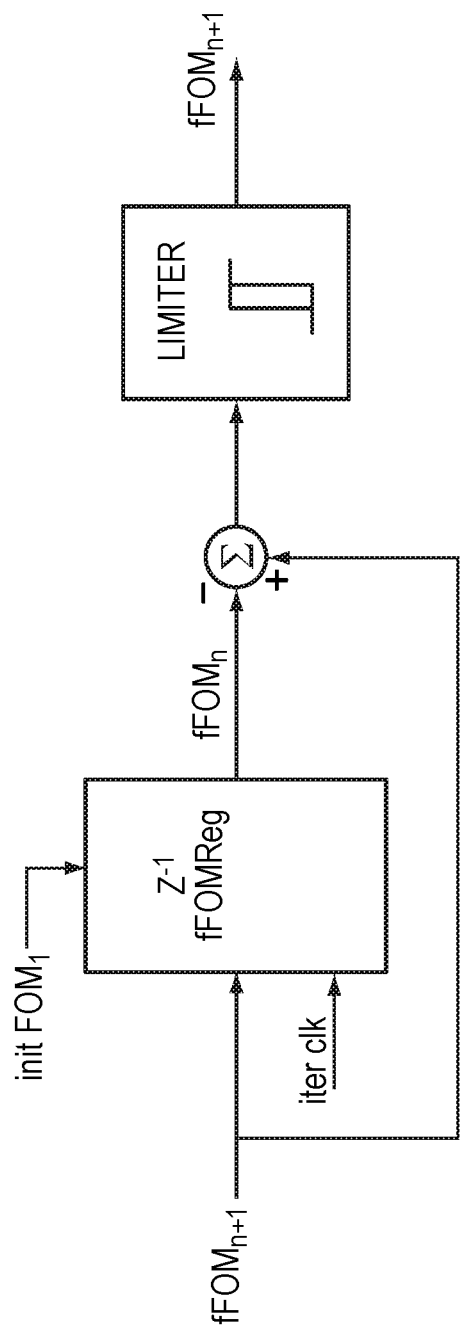
FIG. 9 is a block diagram of an example differentiator in one embodiment.

FIG. 9 is a block diagram of an example differentiator 900 that may be implemented in the logic 700 of FIG. 7. The differentiator can be implemented by a simple delay and subtract circuit. The resultant gradient is signed even though the input is unsigned. The output range can be optionally limited to reduce gate count downstream. The limiter sets the maximum gradient (delta FOM) which is equivalent to adding a slew rate limit to the FOM transient but has no effect in the region of interest around the optimal FOM when the gradient approaches zero.

Figure 10:
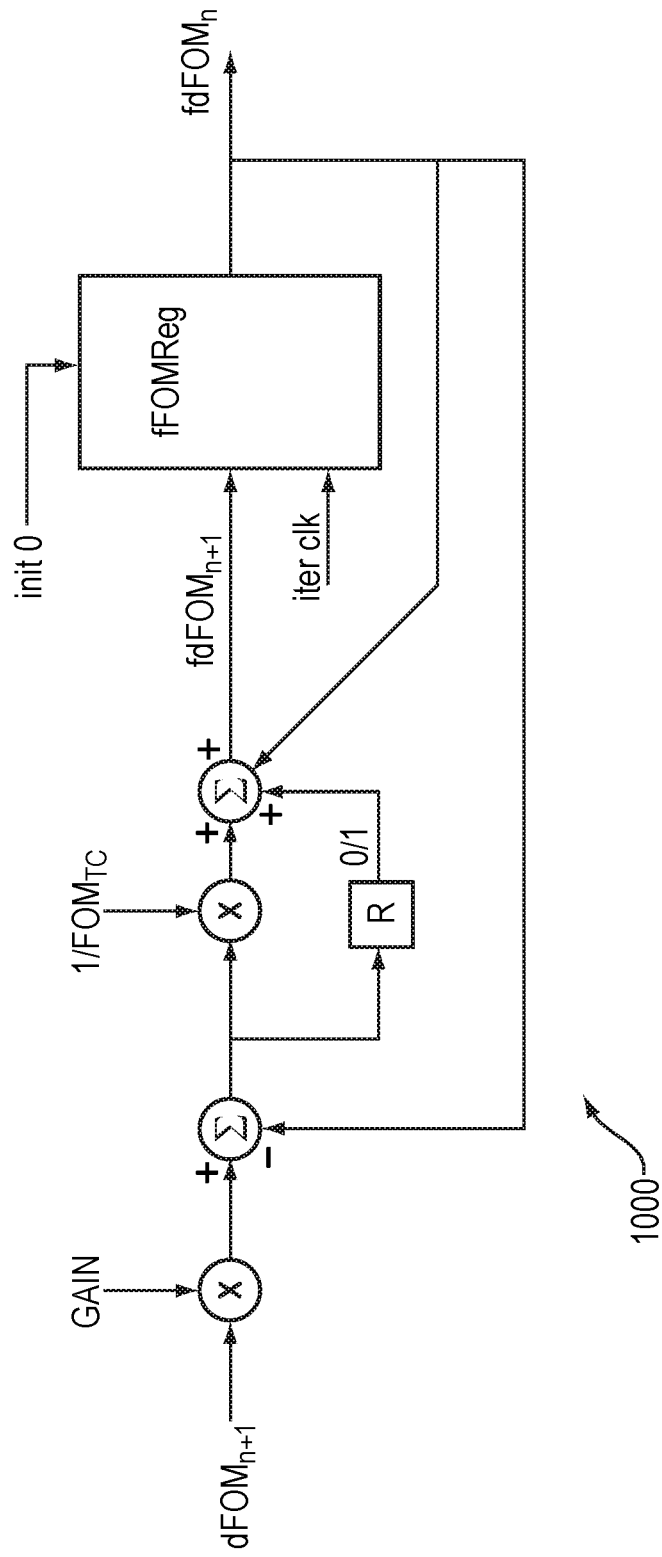
FIG. 10 is a block diagram of an example delta FOM filter in one embodiment.

FIG. 10 is a block diagram of an example delta FOM low pass IIR filter 1000 that may be implemented in the logic 700 of FIG. 7. Filtering the gradient value can run into quantization issues with the division (shift) when the gradient approaches zero. As shown, gain can be added prior to the filter to alleviate this problem and the filter structure can be adjusted to accommodate the gain:

$$fFOM_{n+1} = fFOM_n + \text{round}\left(\frac{FOM_{n+1} - fFOM_n}{FOM_{TC}}\right) \quad (4)$$

If the gain is set to $FOM_{TC}$ then the filter can be simplified:

$$fFOM_{n+1} = fFOM_n + \text{round}\left(\frac{FOM_{n+1} - fFOM_n}{FOM_{TC}}\right) \quad (5)$$

Figure 11:
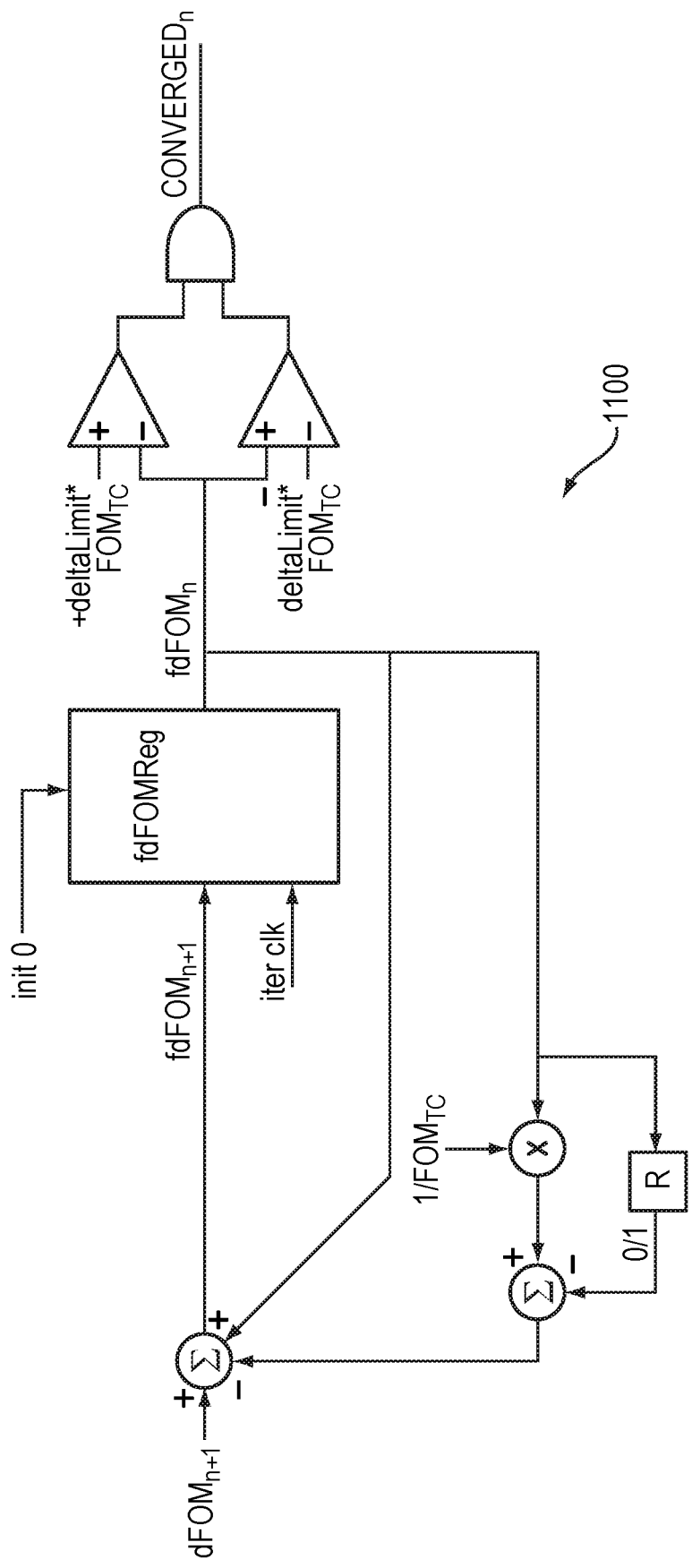
FIG. 11 is a block diagram of an example delta FOM filter in a further embodiment.

FIG. 11 is a block diagram of an example delta FOM low pass IIR filter 1100 implementing the simplification described above. The rounding function is now opposite because of the negative sign, meaning that one is added when the reminder bit is zero. The delta limits for convergence can also be scaled by $FOM_{TC}$ to keep a constant value.

FIGS. 12-15 illustrate an example implementation for link training using FOM averaging. The controller 120 may optimize the transmitter tap settings by repeatedly estimating the receiver SNR (also referred to above as FOM or FOM) and moving along the upward gradient towards the optimal FOM value. Measurement noise is inherent in the FOM estimates due to finite sampling time of receiver statistics, receiver control quantization and other factors. Better FOM estimation may yield better gradient estimates and more accurate and repeatable convergence of the transmit tap settings. The controller 120 may continuously dither the transmit tap settings to measure the gradient and when the controller 120 is close to the optimal settings the algorithm dithers around the same tap setting area repeatedly. Gradient averaging takes advantage of this behavior by averaging the FOM measurements per tap location around the optimal value which improves the FOM estimates over time in this area and leads to more accurate and predictable convergence. Averaging may not offer an advantage when the taps are in transient from the start value to the final value. Thus, averaging may be only enabled after the "minimum iteration" counter has expired (e.g., 50 iterations).

Figure 12:
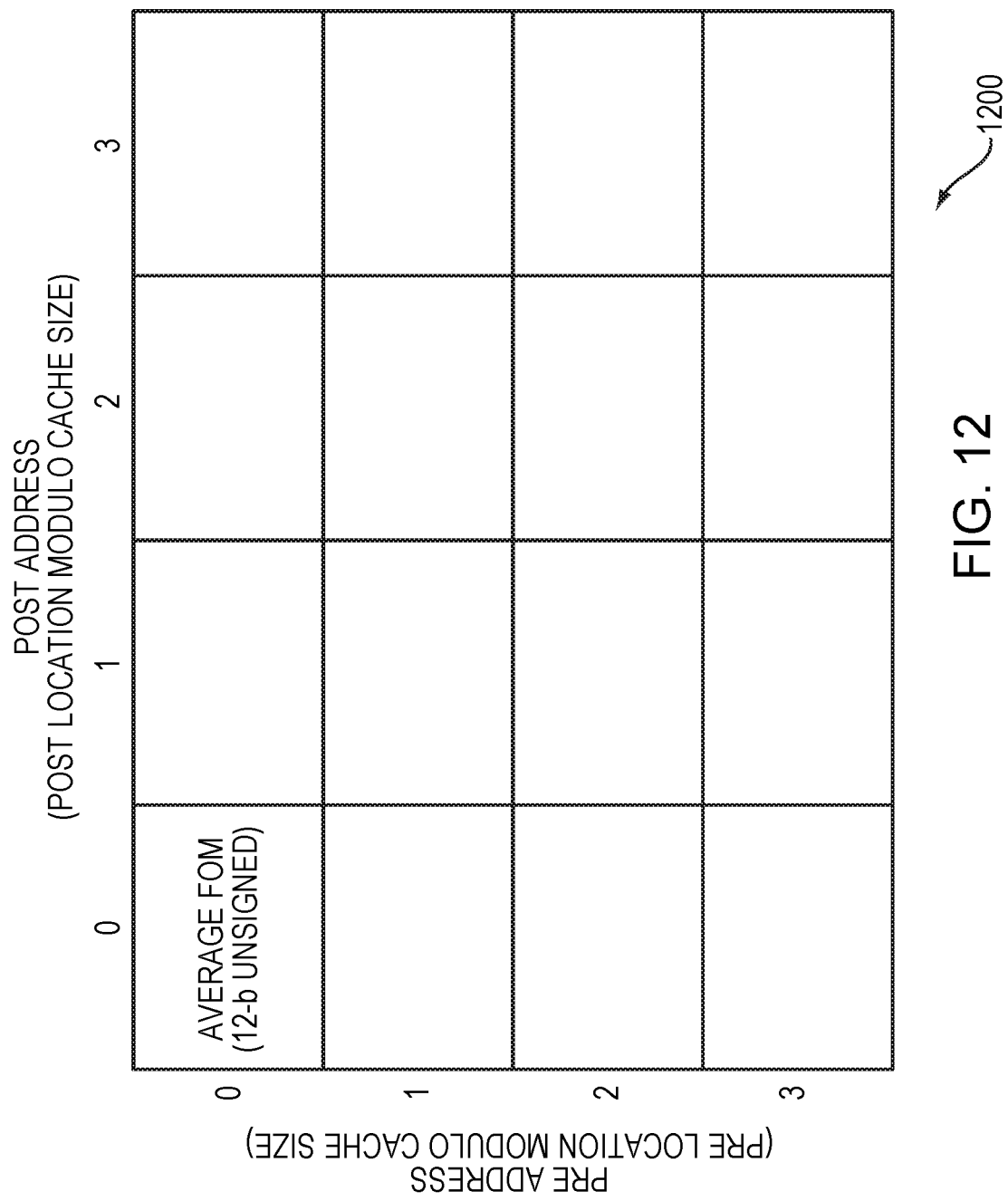
FIGS. 12 and 13 are tables illustrating data structures in one embodiment.
Figure 13:
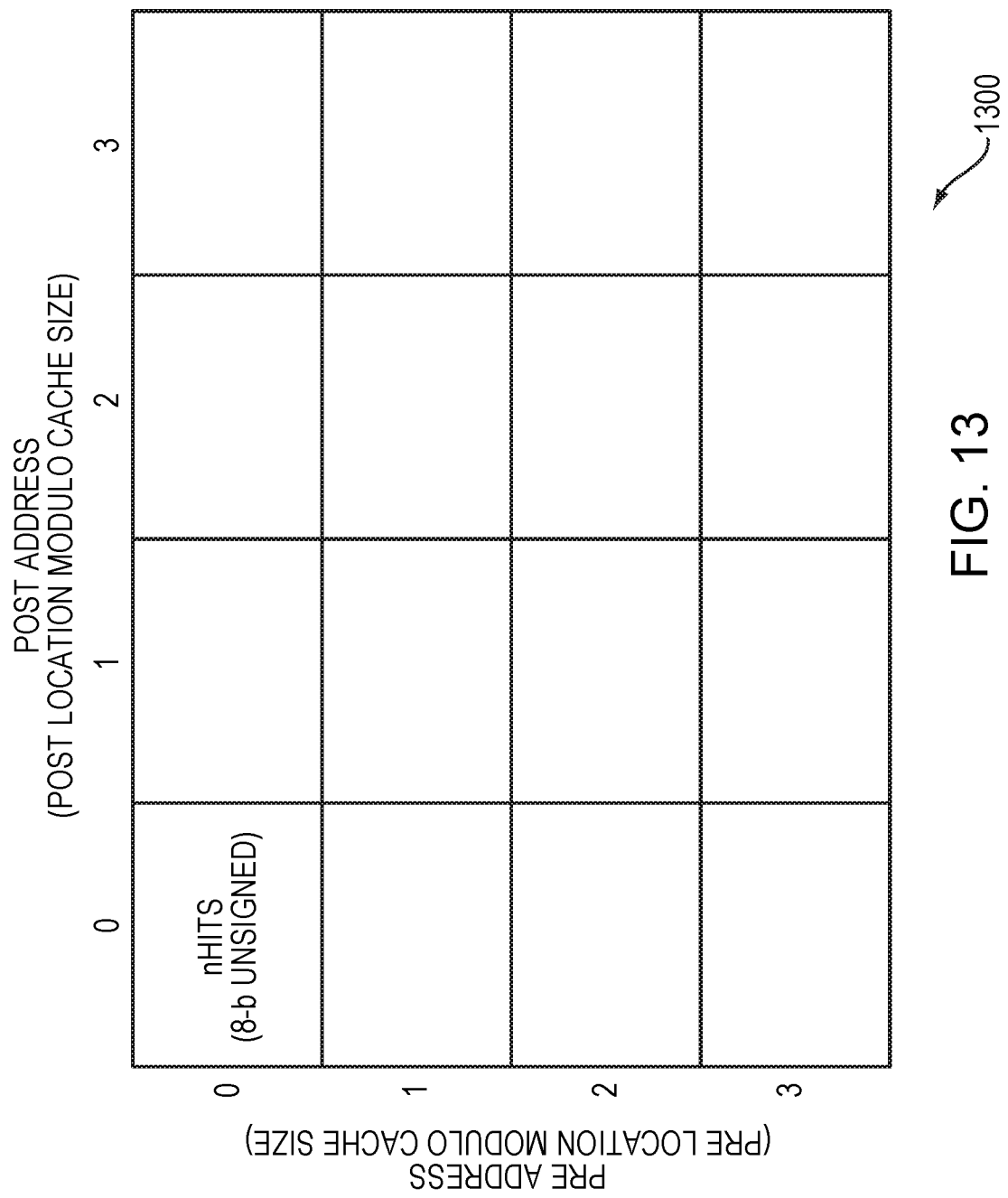

FIGS. 12 and 13 are tables illustrating data structures that may be stored to the cache 152 in one embodiment. FIG. 12 illustrates an average FOM data structure 1200. The controller 120 may store an average FOM value for a small region of transmit tap settings around the optimal value, as storing across all tap settings may not be practical. A moving store with a range of 4 pre- and 4 post-tap settings around the optimal tap value may be sufficient. This implementation may be met by a memory structure of 12×4×4=192 bits arranged as a 2-dimension array. The number of times (nhits) a specific tap location has been measured is used to compute the cumulative moving average (CMA) at that location. An 8-bit unsigned integer storing up to 255 hits (with no rollover) is sufficient. These hits can be stored in a memory structure with 8×4×4=128 bits arranged the same way as the average FOM structure. FIG. 13 illustrates such a memory structure 1300 in one embodiment.

Figure 14:
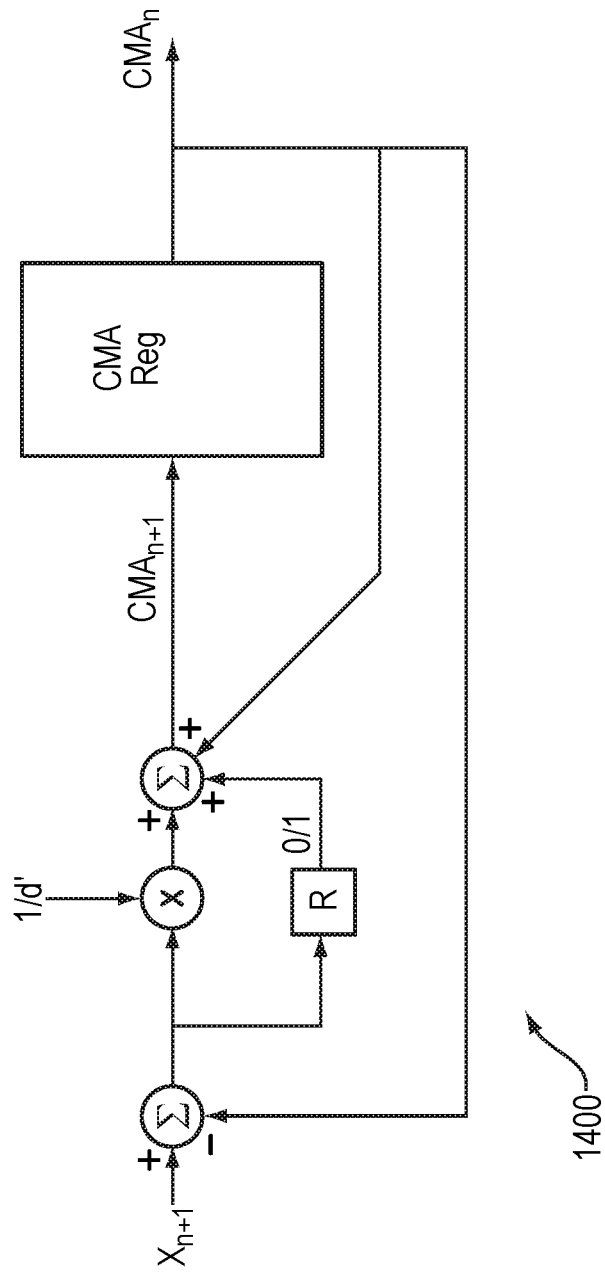
FIG. 14 is a block diagram illustrating a filter for calculating a cumulative moving average (CMA) of the FOM.

FIG. 14 is a block diagram illustrating an IIR filter 1400 for calculating a cumulative moving average (CMA) of the FOM. The CMA up to and including the n+1 sample (hit) may be expressed as follows:

$$CMA_{n+1} = \frac{x_1 + x_2 \cdots x_{n+1}}{n+1} \quad (6)$$

Here, $x_{n+1}$ is the n+1$^{th}$ raw FOM sample. This equation has a simple recursive form which can be implemented as an IIR filter:

$$CMA_{n+1} = \frac{n \cdot CMA_n + x_{n+1}}{n+1} \quad (7)$$

The filter is approximated to turn the division into a shift for state machine implementations.

$$CMA_{n+1} = CMA_n + \frac{x_{n+1} - CMA_n}{d'} \quad (8)$$

Here, $d' \approx n + 1$ (9)

Figure 15:
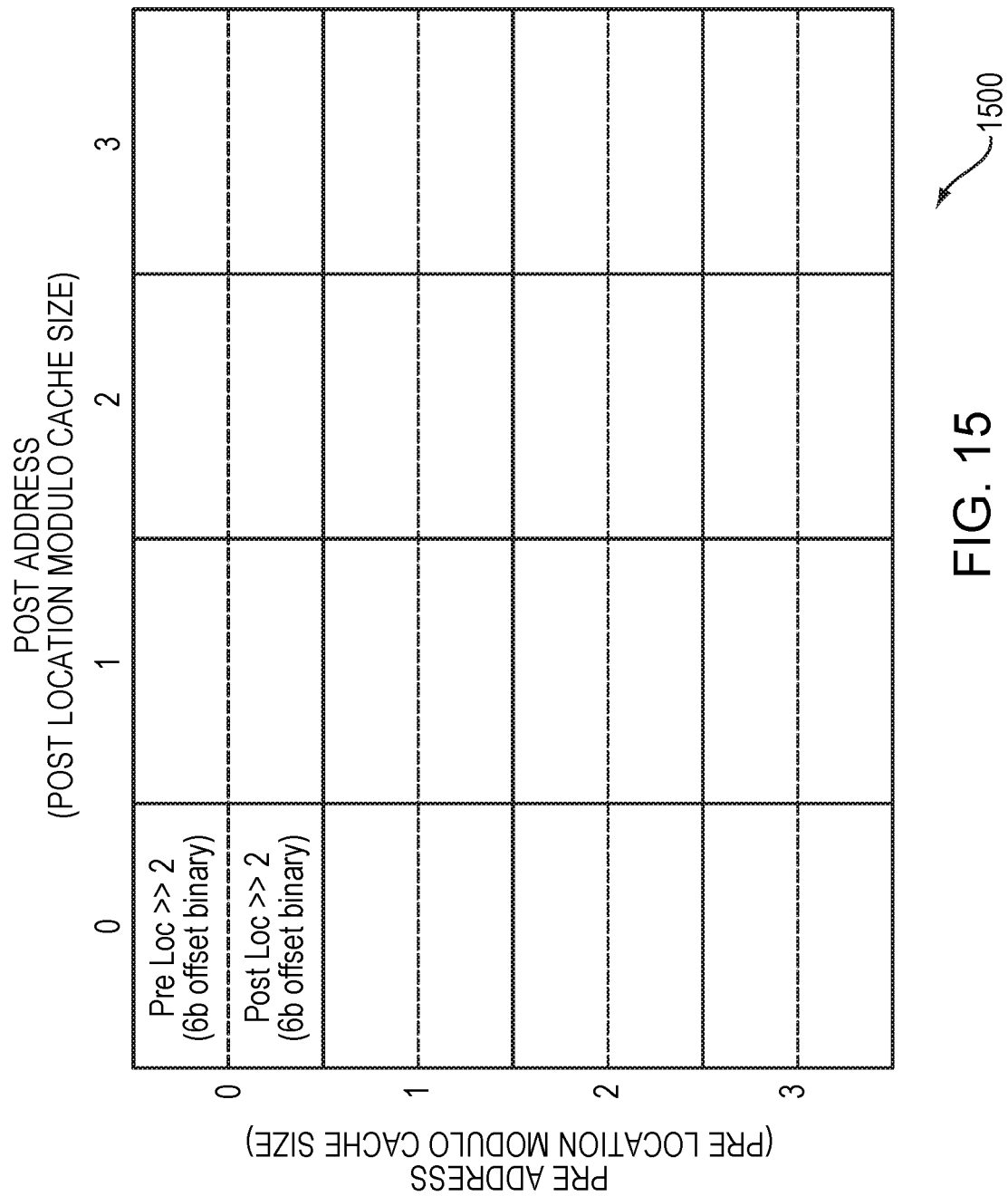
FIG. 15 is a table illustrating an example address valid data structure.

FIG. 15 is a table illustrating an example address valid data structure 1500, which may be stored to the cache 152 in FIG. 1. This memory structure can provide for keeping track of the sliding 4×4 average and hit locations relative to the bigger set of all transmit tap settings. The complete set of all possible transmit tap settings may be first reduced to two 8-bit offset binary integers representing cumulative pre and post tap moves from the starting point in the range −128 to +127. The starting point is not restricted, but is usually Ethernet Preset or Initialize. The two variables can roll over and alias to map wider tap ranges although this would represent a non-compliant physical system. Keeping track of the main tap may be redundant, as the controller 120 may always keep the transmit peak output constant, which uniquely ties the main tap to the pre- and post-tap values.

A simple form of address resolution can be used for state machine implementation. The two pre and post transmit tap locators (preLoc & pstLoc) are aliased modulo cache size to produce the two cache addresses.

$$\begin{bmatrix} preAddr \\ pstAddr \end{bmatrix} = modulo\left(\begin{bmatrix} preLoc \\ pstLoc \end{bmatrix}, cacheSize\right) \quad (10)$$

The cache addresses are the lower two bits of preLoc & pstLoc if cacheSize is four.

The pre- and post-addresses will not alias in a tap region cacheSize×cacheSize (or 4×4 in the typical implementation.) Aliasing beyond this region is checked by an address valid data structure, which stores the upper bits of pre- and post-locators not used in the pre- & post-address calculation. If the upper bits of pre- and post-location match the address valid stored values at a specific location (selected by pre- & post-address), then the location holds valid average FOM and hit data for the current tap setting otherwise the address is reinitialized and becomes valid for future use at the current tap location. This reinitialize process automatically moves the cache across the bigger global tap space until it settles close to where the taps stop moving and averages start to accumulate automatically.

The address valid data structure has (6+6)×4×4=192 bits arranged in the same way as the other data structures. There are two places in the main loop 400 where the cache 152 can be used to improve accuracy: averaging raw FOM measurements, and improving gradient estimation.

The cache 152, configured to maintain the average FOM data structure 1200 as well as the other data structures described above, can operate as a FOM average cache. In such an embodiment, the FOM average cast can be used and managed immediately after every FOM measurement is made by the main loop 400. The FOM measurement (raw-FOM) can be averaged by previous measurements to produce a new FOM if they are available, and the cache can then be updated with the new measurement. The FOM equals the raw FOM if no previous measurements are available. Cache location management may also be included as part of this process.

The FOM average cache can be used by the gradient estimation process to get more accurate moves during the final stages of convergence after the "minimum iteration" timer has expired. The left and right moves along the current axis can be checked independently to determine whether valid cache values are present. If the averaged cache value meets the use criteria then it is substituted for the normal "last gradient" value. The main loop 400 can then continue as normal.

When using averaged FOM values for gradient estimation, if a statistically low-FOM value enters the FOM average cache, then the controller 120 may almost always move along the axis away from that location towards the better FOM as the algorithm dictates. This means the statistically low location is not often chosen or updated, and thus the poor statistics remain are not corrected over time. A separate counter can be added to prevent the cache from being used until a reasonable number of hits (e.g., 4 or 8) are accumulated.

Figure 16:
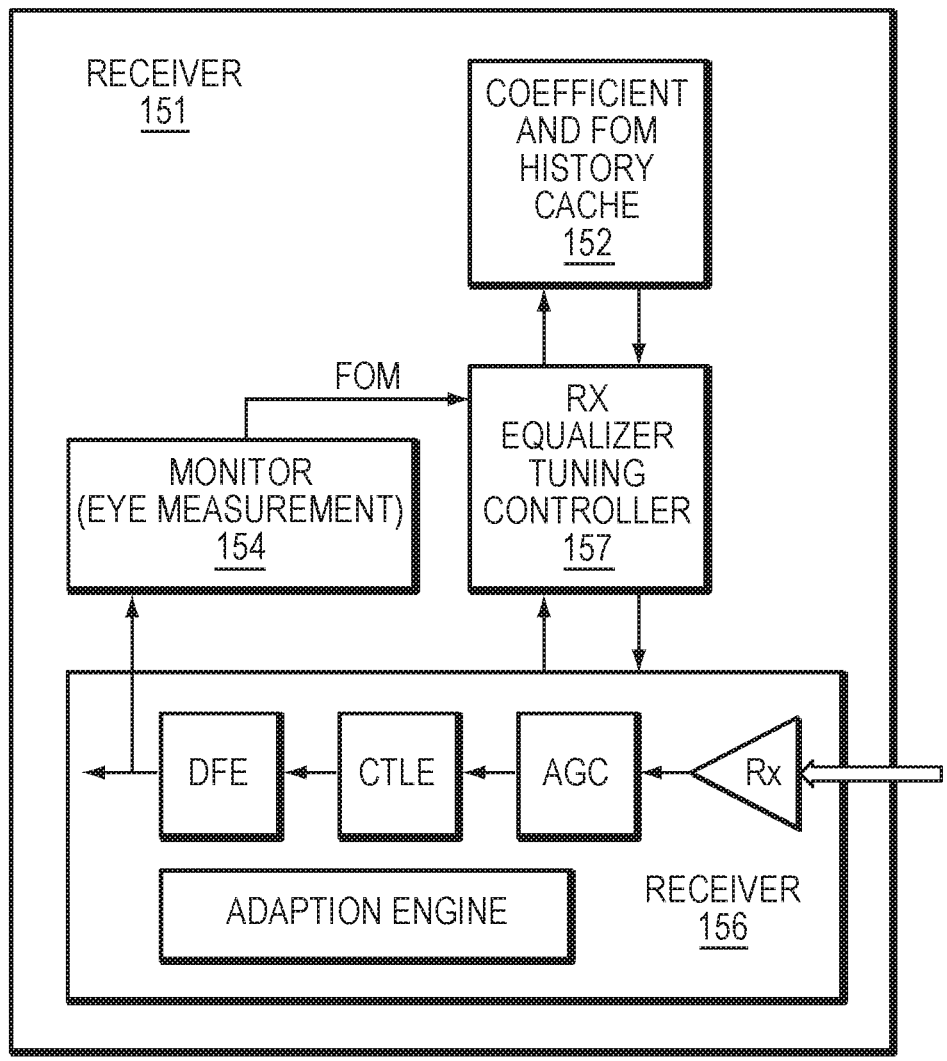
FIG. 16 is a block diagram of a receiver in a further embodiment.

FIG. 16 is a block diagram of a receiver 151 in a further embodiment, which may be implemented in place of the receiver 150 described above with reference to FIG. 1. The receiver 151 may include the controller 120 (not shown), monitor 154 and cache 152 as described above, and may further include a receiver equalizer tuning controller 157 and a receive circuit 156 comprising a receive buffer, an automatic gain control (AGC) circuit, a continuous time linear equalizer (CTLE) filter, a decision feedback equalizer (DFE), and an adaptation engine.

In addition (or as an alternative) to determining adjustment to a transmit equalizer as described above via the controller 120, the receiver equalizer tuning controller 157 may determine adjustment to a local receiver circuit 156 in order to optimize detection of the receiver eye opening of a signal received to the circuit. To do so, the controller 157 may receive operational setting of one or more of the components of the receiver circuit 156, and then perform one or more of the operations described above with reference to FIG. 1-15, adapted to the control settings of the selected components. The controller 157 may further make adjustments to the receiver circuit 156, DFE equalizer filter taps and CTLE high frequency gain, over time to maintain optimal detection of the received signal. The plot of FIG. 3 may be expanded with more axes to allow for more degrees of freedom as a DFE equalizer may in practice have 15 or more equalizer filter taps to adjust. Data structures in FIGS. 12, 13, and 15 would similarly increase in dimensions to support a higher number of DFE equalizer filter taps.

While example embodiments have been particularly shown and described, it will be understood by those skilled in the art that various changes in form and details may be made therein without departing from the scope of the embodiments encompassed by the appended claims.

What is claimed is:
1. A circuit, comprising:
a receiver configured to receive a signal from a transmitter;
a monitor configured to measure properties of the signal and generate a figure of merit (FOM) for the signal, the FOM indicating a measure of signal-to-noise;
a controller configured to:
compare the FOM against a record of previous FOMs and corresponding previous transmitter tap values, the transmitter tap value indicating settings of a transmitter equalizer of the transmitter during transmission of the signal;

determine a differential between the FOM and a plurality of the previous FOMs; and
in response to the differential being positive, select a subsequent tap value from a subset of potential tap values; and
an interface configured to send the subsequent tap value to the transmitter for adjustment of the transmitter equalizer.

2. The circuit of claim 1, wherein the controller is further configured to generate the record based on previous adjustment and measurement of the signal.

3. The circuit of claim 1, wherein the subset of potential tap values each provide a transmit signal amplitude that is substantially the same across the potential tap values.

4. The circuit of claim 1, wherein the subset of potential tap values excludes tap values associated with a signal amplitude that is substantially lower or higher than a signal amplitude associated with the tap value.

5. The circuit of claim 1, wherein the controller is further configured to calculate an average FOM from the plurality of previous FOMs, the differential being relative to the average FOM.

6. The circuit of claim 1, wherein the controller is further configured to determine whether the tap value is a final tap value.

7. The circuit of claim 6, wherein the controller determines the final tap value in response to the differential being below the threshold.

8. The circuit of claim 6, wherein the controller determines the final tap value in response to detecting that the FOM and a plurality of the previous FOMs are within a threshold range.

9. The circuit of claim 6, wherein the controller determines the final tap value based on a match between the tap value and the previous tap values, the match indicating a repetition among tap values.

10. The circuit of claim 6, wherein the controller determines the final tap value in response to a timer surpassing a threshold value.

11. The circuit of claim 6, wherein the controller determines the final tap value in response to detecting the FOM being above a signal quality threshold.

12. The circuit of claim 1, wherein the controller is further configured to detect an adverse move based on the FOM indicating a decrease in signal-to-noise relative to the previous FOMs.

13. The circuit of claim 12, wherein the controller is further configured to select the subsequent tap value to reverse the decrease in signal-to-noise.

14. The circuit of claim 1, wherein the controller is further configured to adjust the receiver equalizer tap coefficients, linear equalizer response, and voltage gain based on the FOM indicating an increase or decrease in signal-to-noise relative to the previous FOMs.

15. A method, comprising:
receiving a signal from a transmitter;
measuring properties of the signal and generate a figure of merit (FOM) for the signal, the FOM indicating a measure of signal-to-noise;
comparing the FOM against a record of previous FOMs and corresponding previous transmitter tap values, the transmitter tap value indicating settings of a transmitter equalizer of the transmitter during transmission of the signal;
determining a differential between the FOM and a plurality of the previous FOMs;
in response to the differential being positive, select a subsequent tap value from a subset of potential tap values; and
sending the subsequent tap value to the transmitter for adjustment of the transmitter equalizer.

16. The method of claim 15, further comprising generating the record based on previous adjustment and measurement of the signal.

17. The method of claim 15, wherein the subset of potential tap values each provide a transmit signal amplitude that is substantially the same across the potential tap values.

18. The method of claim 15, wherein the subset of potential tap values excludes tap values associated with a signal amplitude that is substantially lower or higher than a signal amplitude associated with the tap value.

19. The method of claim 15, further comprising calculating an average FOM from the plurality of previous FOMs, the differential being relative to the average FOM.

20. The method of claim 15, further comprising determining whether the tap value is a final tap value.

21. The method of claim 15, further comprising determining the final tap value in response to the differential being below the threshold.

* * * * *